(12) United States Patent
Allan (10) Patent No.: US 7,441,010 B2
(45) Date of Patent: Oct. 21, 2008

(54) METHOD AND SYSTEM FOR DETERMINING THE AVAILABILITY OF IN-LINE RESOURCES WITHIN REQUESTED WEB PAGES

(75) Inventor: Ronald C. Allan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 10/165,016

(22) Filed: Jun. 6, 2002

(65) Prior Publication Data

US 2003/0229677 A1      Dec. 11, 2003

(51) Int. Cl.
G06F 15/16    (2006.01)
(52) U.S. Cl. ...................................... 709/217
(58) Field of Classification Search ............... 709/203, 709/219
See application file for complete search history.

(56) References Cited

U.S. PATENT DOCUMENTS

| | | | |
|---|---|---|---|
| 5,095,421 A | 3/1992 | Freund | |
| 5,899,991 A | 5/1999 | Karch | |
| 6,094,680 A | 7/2000 | Hokanson | |
| 6,223,200 B1 | 4/2001 | Barnes et al. | |
| 6,263,321 B1 | 7/2001 | Daugherty, III | |
| 6,271,840 B1 * | 8/2001 | Finseth et al. | 715/513 |
| 6,286,046 B1 | 9/2001 | Bryant | |
| 6,308,216 B1 | 10/2001 | Goldszmidt et al. | |
| 6,665,838 B1 * | 12/2003 | Brown et al. | 715/501.01 |
| 6,717,593 B1 * | 4/2004 | Jennings | 715/760 |
| 6,836,801 B1 * | 12/2004 | Parrish et al. | 709/224 |
| 6,941,509 B2 * | 9/2005 | Harris | 715/501.1 |
| 2002/0059193 A1 * | 5/2002 | Decime | 707/3 |

OTHER PUBLICATIONS

Elizabeth Castro, "Images Don't Appear", Oct. 20, 1999, Peachpit Press, p. 1-4, <http://proquest.safaribooksonline.com/0201354934/ch20lev1sec5.*

* cited by examiner

Primary Examiner—Jason Cardone
Assistant Examiner—Minh-Chau Nguyen
(74) Attorney, Agent, or Firm—Duke W. Yee; Jeffrey S. LaBaw; Wayne P. Bailey (57) ABSTRACT

A method, system, apparatus, and computer program product are presented for processing Web page documents to determine the availability or unavailability of in-line resources within a Web page. A transaction monitor receives an indication from a Web browser that a Web page has been retrieved, after which the transaction monitor examiners a document object model maintained by the Web browser for the retrieved Web page. The transaction monitor determines whether the document object model indicates that a set of one or more in-line resources in the retrieved Web page is unavailable, and in response, the transaction monitor generates an unavailability indicator for an unavailable in-line resource. The unavailability indicator may be signaled through an appropriate software event, placed in a statistical database, or presented on a display as graphical information for a user of the transaction monitor.

16 Claims, 6 Drawing Sheets

```
├── onrowsdelete      Null                                                        300
├── onrowsinserted    Null
├── onscroll          Null
├── onselectstart     Null
├── outerHTML         "<IMG height=30 alt="" scr="http://us.a1.yimg.com/a/ed/ediets_men/t">
├── outerText         ""
├⊞ parentElement
├⊞ parentNode
├⊞ parentTextEdit
├── previousSibling   Nothing
├── protocol          "Hyper Text Transport Protocol"
├── readyState        "complete" ── 302
├── recordNumber      Null
├── scopeName         "HTML"
```

*FIG. 3A*

```
├── onrowsdelete      Null                                                        304
├── onrowsinserted    Null
├── onscroll          Null
├── onselectstart     Null
├── outerHTML         "<IMG height=30 alt="" scr="http://us.a1.yimg.com/a/ed/ediets_men/t">
├── outerText         ""
├⊞ parentElement
├⊞ parentNode
├⊞ parentTextEdit
├── previousSibling   Nothing
├── protocol          "Hyper Text Transport Protocol"
├── readyState        "uninitialized" ── 306
├── recordNumber      Null
├── scopeName         "HTML"
```

METHOD AND SYSTEM FOR DETERMINING THE AVAILABILITY OF IN-LINE RESOURCES WITHIN REQUESTED WEB PAGES

BACKGROUND OF THE INVENTION

1. Field of the Invention

The present invention relates to an improved data processing system and, in particular, to a method and apparatus for information processing. Still more particularly, the present invention relates generally to the processing of structured documents.

2. Description of Related Art

The promulgation of non-proprietary technical standards was a significant factor in the growth of electronic communication on the Internet and the World Wide Web. Thousands of Web sites were supported by servers that ran non-proprietary communication protocols to serve Web pages that were written in non-proprietary markup languages. People could easily learn to use a variety of Web-page-authoring applications to create simple, content-oriented, Web sites. Subsequently, more sophisticated Web-site-authoring applications allowed the creation of Web-based applications that performed a variety of complex functions, both for consumers and enterprises.

In conjunction, Web browsers were continually upgraded to handle improvements in various Internet-related protocols or other features. Over time, though, the Web browser market has become dominated by two proprietary Web browsers, Netscape® Navigator/Communicator and Microsoft® Internet Explorer. In contrast to the rapid development of the Web as a whole, though, the slower, proprietary development of these browser applications has somewhat enabled the browsers themselves to become platforms for the development of Web-based applications. With the ubiquitous availability of these Web browsers, software developers can focus their efforts on new or improved Web-based applications that are compatible with these two Web browsers rather than having to worry about compatibility across multiple Web browsers. Although compatibility of a Web-based application with one of these browsers is not a guarantee of market success, it does ensure that the majority of persons that might want to use a Web-based application will be able to do so. Moreover, these two Web browsers continue to incorporate newly introduced or improved Internet-related standards.

Typically, a Web-based-application developer turns his or her attention towards client-side testing of a Web-based application after performing some amount of server-side testing of the Web-based application. Given the state of affairs with Web browsers as described above, a Web-based-application developer needs to perform client-side testing of the application in conjunction with only a few widely available Web browsers.

Although there are many potential errors that may be encountered while performing client-side testing of a Web-based application, a particularly common error is the unavailability of an in-line resource within a requested Web page. Complex Web pages are typically structured such that the initially identified Web document is a parent document that acts as a container of other documents or other data objects. In other words, child documents or objects can be embedded within the parent document by reference; these child documents or child objects are also referred to as in-line resources. When a Web browser initiates a transaction to retrieve the parent document, the browser parses the parent document and discovers the inclusion of in-line resources, thereafter initiating additional transactions to retrieve the in-line resources. Sometimes, however, an in-line resource may not be available, and the Web browser completes the transactions, either by time-out or some other method.

More problematic for the Web-based-application developer, though, is the fact that a Web browser completes its Web-page-rendering process without an unavailable in-line resource in such a way that it may appear to the Web-based application that all in-line resources have been received. In some cases, an unavailable in-line resource merely causes an aesthetic problem in that a user of a browser views a Web page with a missing graphic, which is represented on a rendered Web page by a special icon for the missing graphic image. In other cases, however, the Web-based-application may need an unavailable in-line resource in order to perform some other action, i.e. to complete a transaction, such as manipulating the in-line resource for some purpose in accordance with a previously specified user preference parameter. Hence, the unavailable in-line resource might cause additional errors, and in any case, the application developer needs to be able to discover the source of the error.

In this type of situation, there may be several sources for the error. In a first case, the server may have failed to send the in-line resource. If the server is a publicly available resource that was randomly chosen by the application developer merely as a source of content for the test, then there is little that the application developer can do other than to use a different server. In a second case, if the Web-based application comprises both client-side and server-side processing, then it may be assumed that the application developer has some control over the server and can take some action with respect to the server. In these first two cases, the application developer can use commercially available software tools to discover the error of the missing in-line resource to some degree. For example, a protocol stack sniffer can monitor the client requests and the server responses at the client and then generate a report with the results of the transactions, which allows the application developer to view the data traffic to and from the client and the server, thereby providing the application developer with the opportunity to determine whether a missing in-line resource is due to the fact that a server failed to transmit the in-line resource. However, these tools have limitations, such as the inability to handle concurrent data streams.

Given the fact that a Web-based application relies on the Web browser platform for a significant portion of its Web transaction processing, the Web browser platform itself is a much better source of information about the unavailability of an in-line resource within a requested Web page. Therefore, it would be advantageous to have a method and system for discovering whether or not the Web browser has an indication that an in-line resource is unavailable. It would be particularly advantageous to be able to discover such information in real-time or near real-time.

SUMMARY OF THE INVENTION

A method, system, apparatus, and computer program product are presented for processing Web page documents to determine the availability or unavailability of in-line resources within a Web page. A transaction monitor receives an indication from a Web browser that a Web page has been retrieved, after which the transaction monitor examines a document object model maintained by the Web browser for the retrieved Web page. The transaction monitor determines whether the document object model indicates that a set of one or more in-line resources in the retrieved Web page is unavailable, and in response, the transaction monitor generates an unavailability indicator for an unavailable in-line resource. The unavailability indicator may be signaled through an appropriate software event, placed in a statistical database, or presented on a display as graphical information for a user of the transaction monitor. A user of the transaction monitor can specify various parameters for which types of unavailable in-line resources should be detected, and a user of the transaction monitor can graphically view indications of unavailable in-line resources.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is directed to a method and system for determining the availability of an in-line resource for a requested Web page. In general, the devices that may comprise or relate to the present invention include a wide variety of data processing technology. Therefore, as background, a typical organization of hardware and software components within a distributed data processing system is described prior to describing the present invention in more detail.

Figure 1A:
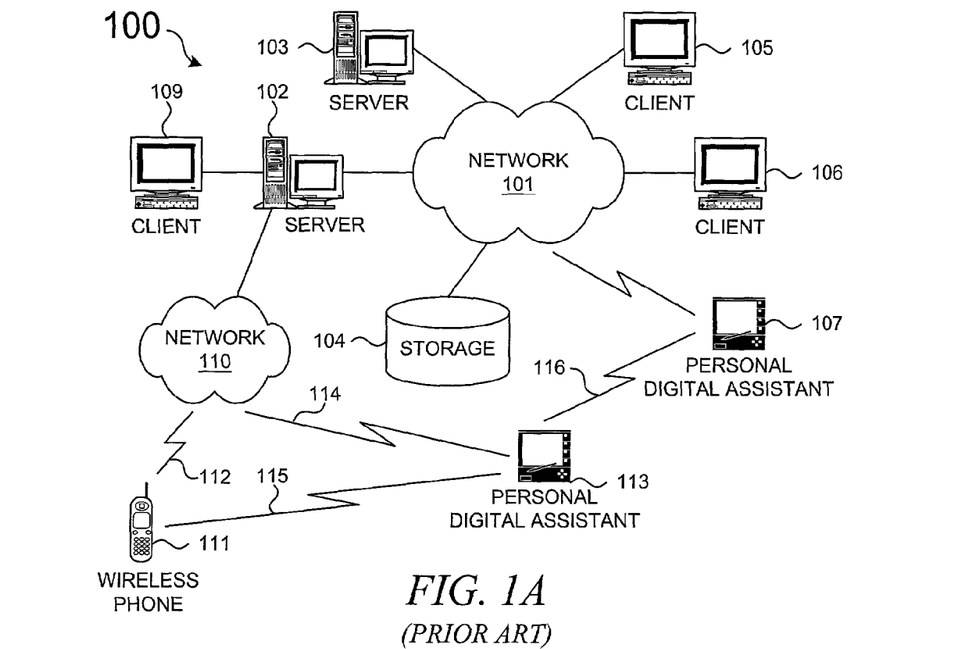
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
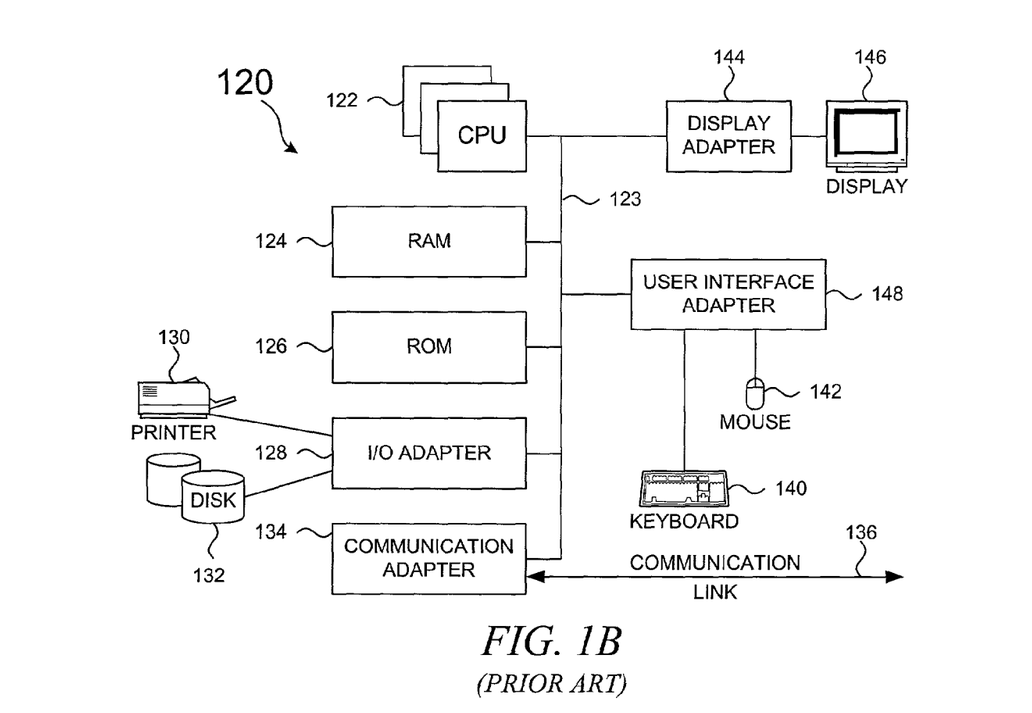
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to determining the availability of an in-line resource for a requested Web page, as described in more detail with respect to the remaining figures.

Figure 2:
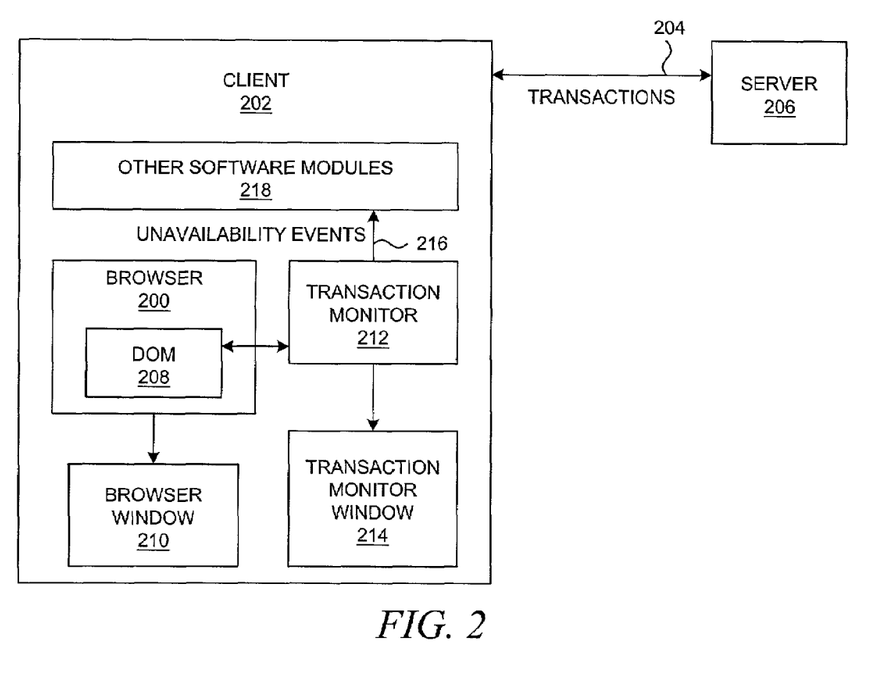
FIG. 2 depicts a transaction monitor in operation with a browser on a client device.

With reference now to FIG. 2, a block diagram depicts a transaction monitor in operation with a browser on a client device. Browser software module 200 on client 202 generates transactions 204 for server 206. A transaction may be described as a set of communication protocol actions between a client and a server. When a user enters a Uniform Resource Locator (URL) or Uniform Resource Identifier (URI) into a location data entry field within the browser or when a user clicks on a hypertext link within a Web page, the browser generates an HTTP request. Typically, the server returns a Web page, which is then parsed by the browser. The browser stores information about the received Web page in objects 208 associated with the Document Object Model (DOM) for the Web page. If the browser determines that the received Web page is actually a container page, i.e. contains in-line resources embedded within the page, then the browser attempts to complete additional transactions for those in-line resources; examples of in-line resources include images or applets. The browser renders the Web page and presents the Web page within browser window 210 on a client-connected display device either concurrently with the retrieval operations or after retrieving all in-line resources.

A document can be very broadly described as a set of information items that can be processed as a unit. Within the context of Web-based applications that manipulate structured documents that are formatted in accordance with markup languages derived from Standard Generalized Markup Language (SGML), e.g., XML or HTML, a document is an ordered collection of elements; an element is an object that contains all the content between the start tag and the end tag that demarcate the element along with any set of attributes that are defined for the element.

The World Wide Web Consortium (W3C), which is responsible for promulgating many of the specifications for Web-related technologies, has defined its Document Object Model in the following manner:

The Document Object Model is a platform- and language-neutral interface that will allow programs and scripts to dynamically access and update the content, structure and style of documents. The document can be further processed and the results of that processing can be incorporated back into the presented page.

The W3C has issued its "W3C DOM Activity Statement" concerning the direction of the evolution of the Document Object Model:

W3C's Document Object Model (DOM) is a standard API (Application Programming Interface) to the structure of documents; it aims to make it easy for programmers to access components and to delete, add, or edit their content, attributes and style. In essence, the DOM makes it possible for programmers to write applications which work properly on all browsers and servers and on all platforms. While programmers may need to use different programming languages, they do not need to change their programming model.

W3C's Document Object Model thus offers programmers a platform- and language-neutral program interface which will make programming reliably across platforms with languages such as Java and ECMAScript a reality.

It should be noted that a DOM is more than a typical data model; it is intended to capture structure and behavior. Hence, the DOM comprises a set of Application Programming Interfaces (APIs) in conjunction with, or as a characteristic of, a set of objects, and the DOM can be implemented in a variety of language-dependent or language-independent manners.

As should be apparent, a specification for the W3C's Document Object Model continues to be improved with the expectation that widely available browsers and other types of Web-based applications will continue to support the W3C's DOM. At any given time, the Netscape® Navigator/Communicator and Microsoft® Internet Explorer browsers may support versions or so-called "flavors" of the W3C's DOM specification. Although some of the examples provided below with respect to the figures are drawn from an implementation of the present invention in conjunction with the Microsoft® Internet Explorer browser, the present invention is intended to work with a variety of Document Object Models and should not be limited to any particular version or flavor of a Document Object Model.

Referring again to FIG. 2, transaction monitor software module 212 operates in association with browser application 200 to monitor transactions that are initiated and/or completed by the browser. A user may specify parameters for the transaction monitor through the graphical user interface presented within transaction monitor window 214. Results of the monitoring operations may be output to files and/or may be presented within transaction monitor window 214. Additional actions by the monitor may include the generation of software events 216 that indicate the availability or unavailability of in-line resources to other software modules 218, as explained in more detail further below.

It should be noted that the browser and the transaction monitor are herein described as software modules because they may be implemented in a variety of form factors, such as fully-featured applications, plug-ins, or Microsoft® ActiveX™ controls that are under the control of another application. One of ordinary skill in the art would understand that the steps, means, or instructions of a process, apparatus, or computer program product that incorporates the present invention is not limited by the form in which the present invention is implemented.

Figure 3A:
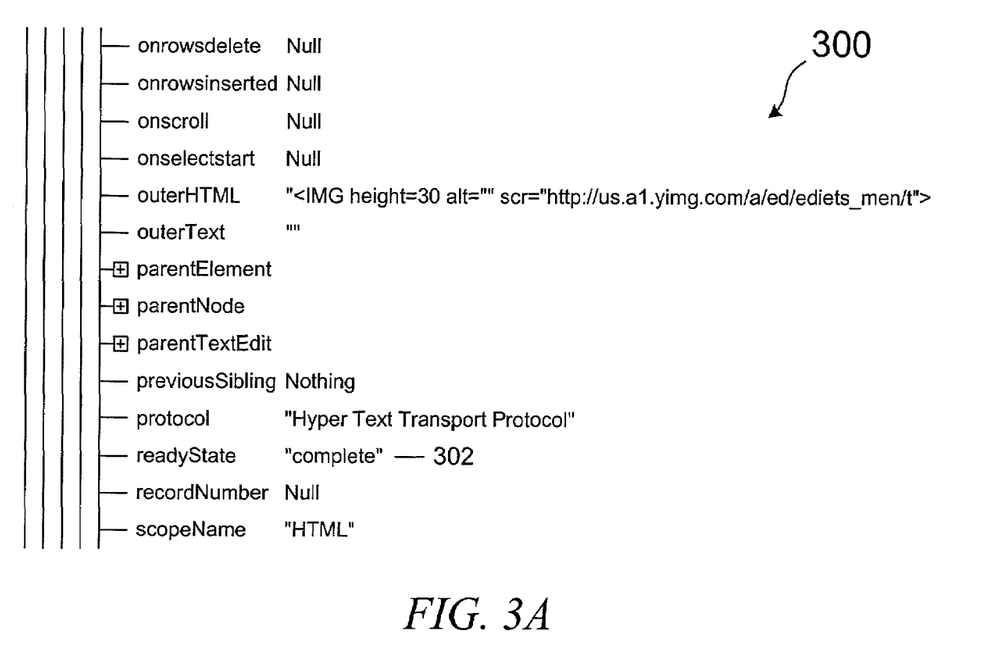
FIGS. 3A-3B depict portions of a graphical user interface window that show representations of portions of a Document Object Model for an in-line resource.
Figure 3B:
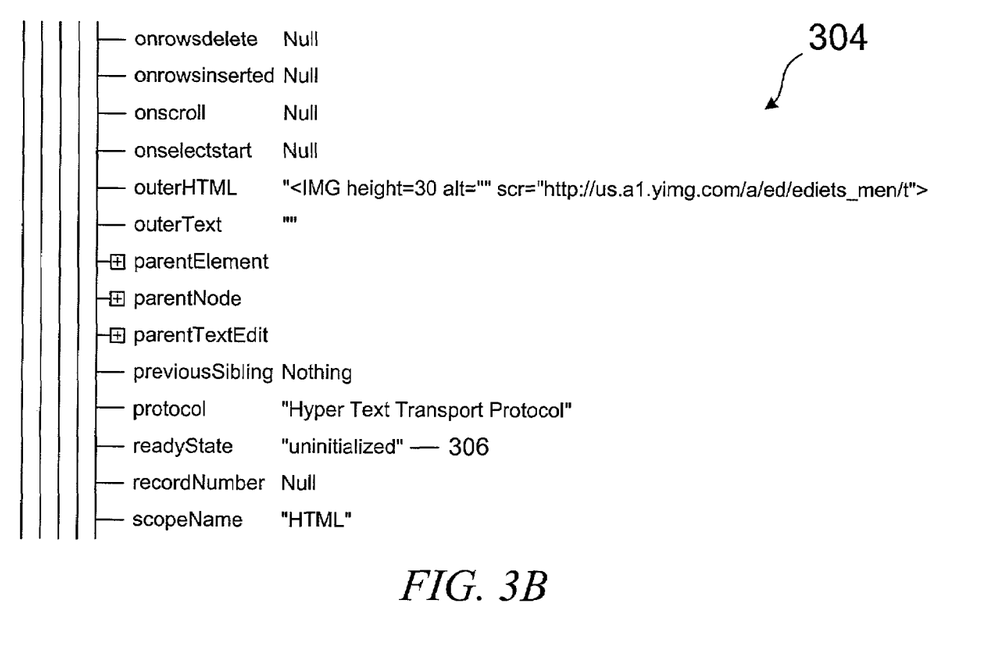

With reference now to FIGS. 3A-3B, portions of a graphical user interface window show representations of portions of a Document Object Model for an in-line resource. As noted above, a requested Web page and its in-line resources are retrieved by a browser in response to different types of user input. At some point in time, the browser has retrieved a container page and its in-line resources and processed them such that they are reflected in the Document Object Model for the container page.

For example, the Internet Explorer DOM for a container page reflects each in-line resource and its surrounding markup language formatting. The APIs supplied via the Microsoft IHTMLDocument2 interface make it possible to traverse these in-line resources in sequence so that the in-line resources and/or their properties can be retrieved from the DOM and then manipulated by an application as desired.

Within an Internet Explorer DOM, a "readystate" property indicates the current state of an in-line resource within a container page. This property can have one of five possible values:

uninitialized: Object is not initialized with data.
loading: Object is loading its data.
loaded: Object has finished loading its data.
interactive: User can interact with the object even though it is not fully loaded.
complete: Object is completely initialized. This property is read-only, and an in-line resource can skip certain states if those states do not apply to that in-line resource.

After retrieving the information about a container page from its DOM through the appropriate API, a graphical representation of the DOM can be constructed by a software development tool. FIG. 3A and FIG. 3B are screen shots of an Internet Explorer Document Object Model tree fragment representation. As noted above, this DOM is an implementation of the W3C specification for documents. The DOM APIs allow for traversal, insertion, removal, and updating of any portion of a document, such as an in-line resource and/or its properties, although some properties may be read-only with respect to software modules such as plug-ins or software development tools, i.e. software modules other than the browser application. The tree fragments shown in FIG. 3A and FIG. 3B correspond to an HTML document such that each tree node is a portion of the document itself. In other words, the tree representation reflects the hierarchical structure of the document and its DOM. In a manner similar to the drive-folder-file trees that are shown in Microsoft Windows Explorer, each vertical line along the left-hand side of a tree fragment represents a parent-child relationship among two nodes in the tree; each horizontal line either ends at a leaf node, such as a property value, or represents another parent-child relationship that can be expanded or collapsed to view another portion of the tree. FIG. 3A and FIG. 3B can be generated by obtaining screen shots of a graphical representation of a DOM within the Microsoft Visual Basic Integrated Developers Environment (IDE). However, many different applications are capable of representing a DOM in a graphical format.

FIG. 3A shows a portion of a graphical, tree-like representation 300 of a Document Object Model in accordance with the Internet Explorer DOM. The "readystate" property 302 indicates that an in-line resource has been retrieved successfully because the value of the "readyState" property is "complete". In contrast, FIG. 3B shows a portion of a graphical, tree-like representation 304 of a Document Object Model in accordance with the Internet Explorer DOM in which the "readystate" property 306 indicates that an in-line resource has not been retrieved successfully because the value of the "readystate" property is "uninitialized".

FIGS. 3A-3B show examples in accordance with the Internet Explorer DOM. Depending on the browser and the type of DOM that is supported, different object properties would be consulted for an initialization state in order to determine whether an in-line resource was available or not.

Figure 4:
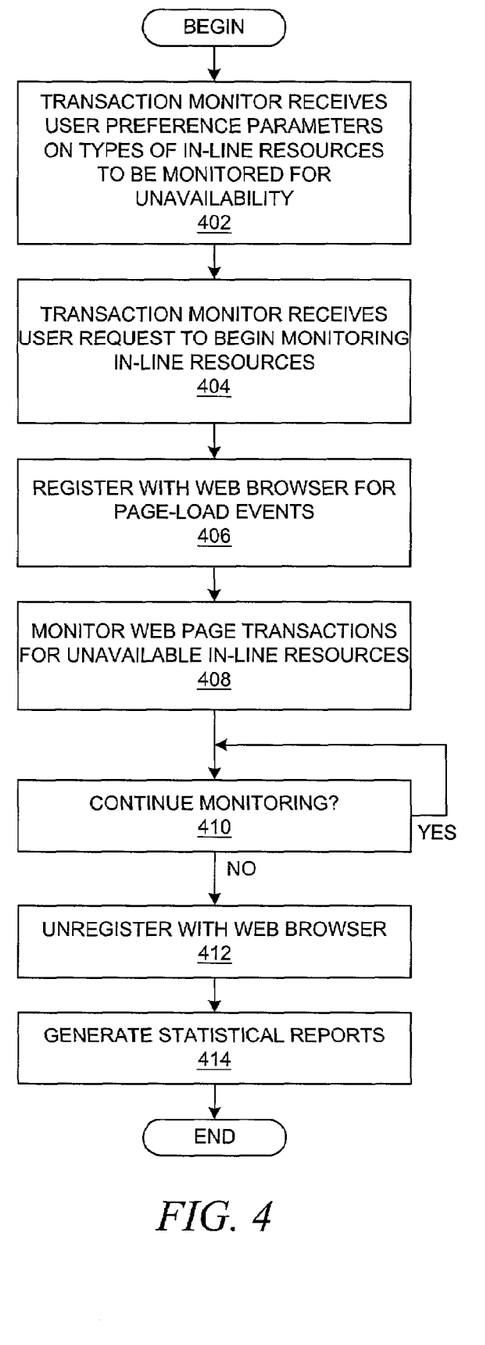
FIG. 4 depicts a process within a transaction monitor for initiating and terminating the monitoring of unavailable in-line resources.

With reference now to FIG. 4, a flowchart depicts a process within a transaction monitor for initiating and terminating the monitoring of unavailable in-line resources. The process begins with the transaction monitor receiving user input for preference parameters about the types of in-line resources that should be monitored for unavailability (step 402). The transaction monitor stores these values for subsequent use during the actual monitoring process.

At some point in time, the transaction monitor receives user input to begin monitoring in-line resources for unavailability (step 404). The transaction monitor then registers with the Web browser in an appropriate manner so that the Web browser sends software events to the transaction monitor whenever the Web browser finishes loading a requested Web page (step 406). For example, the transaction monitor can provide a reference to a callback routine to the Web browser by calling an appropriate API, and when the Web browser finishes loading a Web page, it determines which software modules have registered for such events and informs them through an appropriate mechanism, such as calling their previously registered callback routines. Various other types of signaling mechanisms or event listeners may be used for this purpose.

After this registration operation is complete, then the transaction monitor may begin monitoring for the unavailability of in-line resources (step 408). It should be noted that the transaction monitor may perform many different types of monitoring operations with respect to Web transactions, in which case the monitoring for the unavailability of in-line resources is merely one such monitoring operation. The transaction monitor continues this monitoring operation as appropriate (step 410); this may be viewed as remaining in an indefinite monitoring loop until an indication is provided to do otherwise, such as through a user input operation that requests that the monitoring for the unavailability of in-line resources should be stopped.

After the transaction monitor determines that the monitoring operation should be stopped, then the transaction monitor unregisters itself with the Web browser (step 412), e.g., by requesting that the Web browser delete the transaction monitor's event listener. If necessary, the transaction monitor may perform various post-processing activities, such as generating statistical reports on the monitoring operation (step 414), thereby completing the process shown in the flowchart.

Figure 5:
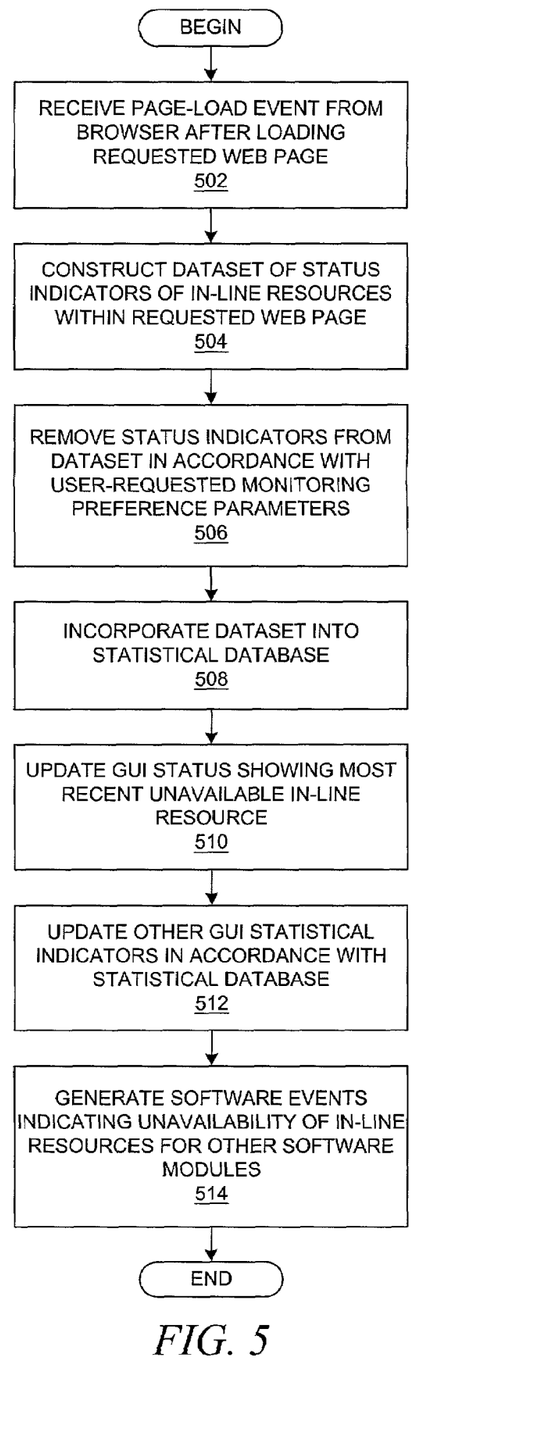
FIG. 5 depicts further detail for a monitoring process for unavailable in-line resources as performed by a transaction monitor.

With reference now to FIG. 5, a flowchart depicts further detail for a monitoring process for unavailable in-line resources as performed by a transaction monitor. The flowchart shown in FIG. 5 provide further detail for step 408 shown in FIG. 4 in which the transaction monitor is actively monitoring for unavailable in-line resources. For ease of demonstration, the examples below assume that at least one in-line resource has been determined to be unavailable during the retrieval of a requested Web page, but it should be noted that the number and type of unavailable in-line resources would depend upon the execution environment, e.g., a testing environment might cause many in-line resources to be unavailable.

The process begins with the transaction monitor receiving a load event for a Web page from a browser application that has loaded a requested Web page (step 502); it should be noted that the transaction monitor module and the Web browser module are not necessarily required to be executing on the same physical computing device or data processing system. The transaction monitor then uses the appropriate APIs to read information from the DOM for the requested Web page in order to construct a temporary dataset of status indicators and other information associated with in-line resources within the requested Web page (step 504). As noted above with respect to FIGS. 3A-3B, depending on the DOM that is used by the browser, different types of properties for the in-line resource objects may need to be examined in order to make a determination of whether the in-line resource is available or unavailable.

In accordance with previously specified preference parameters, the transaction monitor then removes status indicators from the temporary dataset for certain in-line resources (step 506), such as in-line resources that do not have file names or file types that match the user-specified preference parameters, thereby filtering the temporary dataset. In this manner, the user is able to customize the behavior of the transaction monitor such that it only monitors those in-line resources that are of interest to the user. For example, the user may desire to monitor only in-line resources that are applets.

The in-line resources that have been determined to be unavailable are then incorporated into a statistical database in an appropriate manner (step 508) if necessary or if requested to do so by the user of the transaction monitor. For example, a separate record might be created for each unavailable in-line resource, and each record might provide several data items per in-line resource, such as parameters associated with the runtime environment, date and time of observation, name, size, and type of file, or other data items. In other implementations, the names and/or file types of the unavailable in-line resources might be tracked statistically in real time through a variety of metrics, such as time-of-day, file size, characteristics of the download operation for the in-line resources, or other metrics.

It should be noted that the DOM could be examined in many equivalent manners in order to determine the unavailability of in-line resources. It is not necessary to use a temporary dataset of status indicators and other information associated with the in-line resources. For example, statistical computations and other recordation operations could be performed in real time for each in-line resource as it is encountered while scanning the DOM for the requested Web page. The present invention is not limited by the manner in which the DOM is analyzed for this information.

The transaction monitor can also update an on-screen, real-time status indicator for the most-recently discovered unavailable in-line resource (step 510) if the transaction monitor provides this option or if the user has requested this option. Other GUI indicators may also be updated, such as statistical indicators that reflect the current values in the statistical database of unavailable in-line resources (step 512).

In addition, the transaction monitor may generate software events that indicate unavailability of one or more in-line resources to other software modules (step 514), thereby completing the process shown in the flowchart. In a manner similar to the transaction monitor registering with the browser to receive events when the browser determines that it has finished loading a requested Web page, other software modules can register with the transaction monitor to receive events when the transaction monitor determines that an in-line resource is unavailable. This may be particularly useful for some Web-based applications because other software modules may rely upon the existence of those in-line resources as input for other processes that cannot function without the in-line resource objects. In this case, the transaction monitor acts as a type of middleware for those other software modules in order to examine various types of DOMs on behalf of those other software modules.

The software modules that receive the unavailability events may be incorporated into a coordinated test suite in which the software modules perform different test functions as requested by a user of the suite. For example, the transaction monitor can indicate to other software modules that an in-line resource in a requested Web page is unavailable, and after being notified through an event that signals unavailability, other software modules in the testing suite may be able to cross-reference identification information about the unavailable in-line resource with other information. For instance, an in-line resource may be unavailable to the browser for a variety of reasons, such as an error at the server that should have sent the in-line resource or a client-side firewall that blocked the in-line resource from being received by the browser. After detecting unavailable in-line resources within the browser, the testing suite is able to perform other investigatory operations to assist in a determination of why the in-line resource became unavailable.

It should also be noted that the software modules that receive the unavailability events may not be co-located on the same computing device on which the browser application is executing. In other words, the unavailability events may be sent through a network to another device. Moreover, assuming that the DOM APIs support remote procedure calls, remote method invocations, or some other form of remote operation, then a transaction monitor could receive events from a browser application while located on a remote device. The transaction monitor could then use remote DOM APIs to determine whether to generate unavailability events for missing in-line resources.

Figure 6:
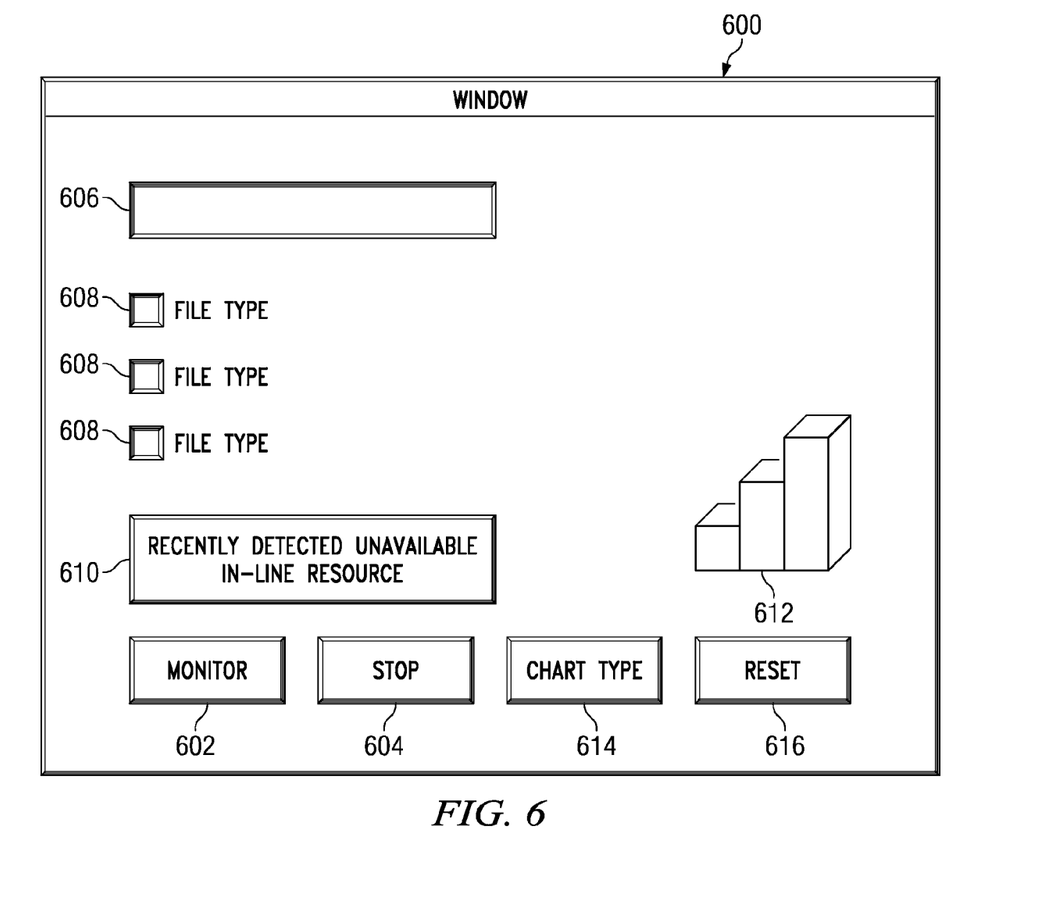
FIG. 6 depicts a graphical user interface window for a real-time transaction monitor that shows user controls for selecting user preference parameters to be used during a process for monitoring the unavailability of in-line resources within requested Web pages.

With reference now to FIG. 6, a graphical user interface window for a real-time transaction monitor depicts user controls for selecting user preference parameters to be used during a process for monitoring the unavailability of in-line resources within requested Web pages. Window 600 shows some of the user controls and information that may be shown in an application window for the transaction monitor with respect to unavailable in-line resources. In other words, the transaction monitor may have other types of concurrent monitoring operations, and these other operations that might also have user controls that would be shown in the same application window.

"Monitor" button 602 allows a user to start the monitoring process, as reflected in step 404 shown in FIG. 4, while "Stop" button 604 allows a user to halt the monitoring process, as reflected in step 410 shown in FIG. 4. Data entry field 606 accepts user input for one or more file names or wildcards for in-line resources that the user desires to monitor; checkboxes 608 indicate the file types that should be monitored. Different types of GUI controls, such as drop-down menus, could be used within window 600 for allowing a user to set various preference parameters.

Window area 610 provides information about the most recently detected unavailable in-line resource. Window area 612 provides a bar chart showing the percentage of availability of in-line resources according to file type as reflected in a statistical database. From this information, the user of the transaction monitor is able to view real-time information about unavailable in-line resources. Other types of information may be reflected in the chart, such as moving averages over different periods of time. "Chart type . . . " button 614 allows a user to select the type of chart or graphic that the user desires to view, such as a pie chart, a histogram, or other chart type. "Reset" button 616 allows the user to reset the chart, thereby allowing the user to start a new time period such that the chart only contains information about unavailable in-line resources that were detected since the chart was reset.

Figure 7:
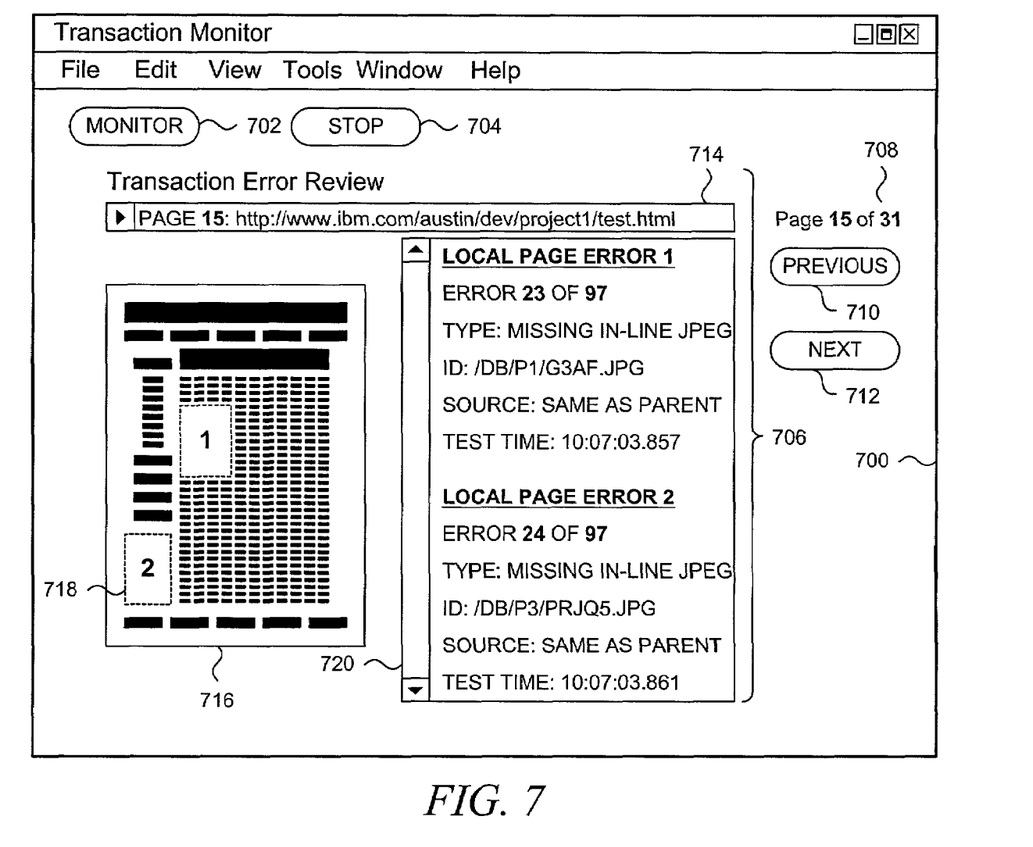
FIG. 7 depicts a graphical user interface window for a real-time transaction monitor with functionality for reviewing one or more Web pages that resulted in the generation of an unavailability event due to the unavailability of an in-line resource within a Web page.

With reference now to FIG. 7, a graphical user interface window for a real-time transaction monitor depicts functionality for reviewing one or more Web pages that resulted in the generation of an unavailability event due to the unavailability of an in-line resource within a Web page. In a manner similar to that shown in window 600 in FIG. 6, window 700 in FIG. 7 shows some of the user controls and information that may be included in an application window for a transaction monitor with respect to unavailable in-line resources. In contrast to window 600, which showed accumulations of statistical information gathered for many missing in-line resource events over many page requests, window 700 is used to review each Web page that had a missing in-line resource. An unavailability event, as mentioned above, would include information associated with one or more missing in-line resources, and this information would be parsed for display to a user of the transaction monitor. In this manner, the transaction monitor can present both large statistical information datasets associated with many missing in-line resource events along with individual missing in-line resource events/errors.

"Monitor" button 702 allows a user to start the monitoring process, while "Stop" button 704 allows a user to halt the monitoring process. Window area 706 presents information for a user to review the transaction errors that have been detected by the transaction monitor application. Data field 708 shows the total number of Web pages on which the transaction monitor has detected errors and the ordinal number of the current page that is being reviewed. "Previous" button 710 jumps to the previous Web page in the list of pages with errors, while "Next" button 712 jumps to the next Web page in the list of pages with errors. Drop-down menu 714 shows the URI of the page that is currently being reviewed and allows the user to select a different Web page in the error list. Other information items could be shown in window 700; different types of GUI controls could be used within window 700 for allowing a user to review various other information items. In addition, the transaction monitor could present the errors in real-time.

When the transaction monitor detects that a Web page has a missing in-line resource, it can generate an event, and the event contains information associated with the missing in-line resource. The transaction monitor allows a user to review these events individually through the user interface, such as window 700. Page graphic 716 provides a representative graphical illustration of a particular Web page in a list of pages in which transaction errors have been detected. Page graphic 716 may be a simplified rendering of the particular Web page in which most of the content has been quickly rendered in a non-distracting manner; various well-known techniques could be used for this form of rendering, such as greeking text and replacing image objects with gray boxes, as shown in FIG. 7. Alternatively, page graphic 716 is a miniature yet complete rendering of the particular Web page.

If the missing in-line resources is being displayed to a user in real-time, page graphic 716 might be replaced with a new page graphic each time that the transaction monitor detects that a Web page has a missing in-line resource. For example, the transaction monitor may be part of a testing suite of applications, and this testing suite runs various scripts that generate requests for Web pages. Hence, over a period of time, many Web pages may be received, and the transaction monitor may detect missing in-line resources. Assuming that the testing environment is relatively stable and does not generate too many errors, the Web pages that have errors could be displayed in real-time. If missing in-line resources were detected slowly enough, e.g., once every few seconds such that the user would be able to scan page graphic 716, then the user could spot trends in the errors in a visual manner. This type of visual information could augment the statistical information that is shown in window 600, although both types of information could be shown in the same window.

Page graphic 716 contains error indication box 718 with a local page error identifier, which is an integer number in this example. Other types of error indicators could be used, such as color codes, other geometric shapes, or other graphical techniques or objects. Preferably, these error indicators are placed in the same relative position in page graphic 716 as the relative position occupied by the unavailable in-line resource in the original Web page. Alternatively, page graphic 716 may be a thumbnail image of the Web page with additional graphic indications applied to the thumbnail image to graphically emphasize the detected errors. In essence, page graphic 716 is a graphic object that represents a retrieved Web page and its in-line resources such that the graphic object can be incorporated into a display window with other objects or can be incorporated into a Web page along with other objects, i.e. the retrieved Web page itself becomes a child object or child document as an in-line resource within a parent document, i.e. a container page or a container document. Hence, the content and user-interface controls within window 700 may itself be derived from a structured document, such as an HTML or XML page, thereby incorporating page graphic 716 as an in-line resource.

Window area 720 presents detailed information about each transaction error that was detected on the current page. In this example, there are two errors relating to missing in-line resources; the local page error identifier associates the detailed information with a particular error indication box. Additional information could be shown through the use of a scroll bar, pop-up windows, or other interface controls. The detailed information may include the time at which the missing in-line resource was detected, the absolute or relative URL or URI of the missing in-line resource, the source for the in-line resource, such as the server from which the browser application attempted to retrieve the in-line resource, or any other information or property associated with the missing in-line resource.

The advantages of the present invention should be apparent in view of the detailed description of the invention that is provided above. A typical Web-based application relies on a Web browser application for a significant portion of its Web-based transaction processing, including the retrieval and parsing of in-line resources within the requested Web pages that comprise the Web-based application. Sometimes in-line resources are unavailable, potentially causing errors within the Web-based application or otherwise indicating a problem with a Web-based application. Prior art solutions have attempted to detect unavailable in-line resources at a point exterior to the Web browser.

In contrast, the present invention peers at the data objects or data structures inside the Web browser to determine whether or not the Web browser has an indication that an in-line resource is unavailable. Specifically, a transaction monitor examines the Web browser's data objects or data structures associated with its internal representation of the Document Object Model (DOM) for a requested Web page. In accordance with the type of Document Object Model, the transaction monitor determines whether there is an indication that an in-line resource is unavailable. The information about the availability or unavailability of an in-line resource can be compiled into statistical data or reported or signaled as an event. A user of the transaction monitor can specify various parameters for which types of unavailable in-line resources should be detected, and a user of the transaction monitor can graphically view indications of unavailable in-line resources.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing Web page documents, the method comprising:
   receiving an indication from a Web browser that a Web page has been retrieved;
   examining a document object model maintained by the Web browser for the retrieved Web page;
   responsive to the examination of the document object model, determining that the document object model indicates that an in-line resource in the retrieved Web page is unavailable, with the in-line resource and a corresponding in-line resource status being referenced within the document object model; and
   generating an unavailability indicator for the unavailable in-line resource.

2. The method of claim 1 further comprising:
   rendering a graphic object representing the retrieved Web page;
   graphically marking on the graphic object that the retrieved Web page has an unavailable in-line resource; and
   associating the graphic object with additional objects having information associated with the unavailable in-line resource.

3. The method of claim 2 further comprising:
   generating a structured document containing the graphic object and the associated additional objects.

4. The method of claim 3 further comprising:
   displaying the structured document.

5. The method of claim 2 further comprising:
   displaying the graphic object and the associated additional objects within a single user interface window.

6. The method of claim 1 wherein the step of determining that an in-line resource is unavailable further comprises examining a download status property associated with the in-line resource within the document object model.

7. The method of claim 6 wherein the download status property indicates that the in-line resource is in an initialization state.

8. The method of claim 1 further comprising:
   filtering unavailability indicators as specified within the document object module in accordance with user-specified parameters such that certain unavailability indicators are not generated for certain in-line resources that are determined to be unavailable.

9. The method of claim 8 wherein the user-specified parameters are associated with file type, file name, file size, download time, and/or a file name wildcard that are specified within the document object module.

10. The method of claim 1 further comprising:
    registering, with the Web browser, a software module that receives input to begin monitoring unavailability of in-line resources, such that the Web browser sends events to the software module responsive to retrieval of the Web page; and
    sending the unavailability indicator for the in-line resource as an event to the software module.

11. The method of claim 1 wherein the unavailability indicator is generated by a software module on a first computing device and the Web browser executes on a second computing device.

12. The method of claim 1 further comprising:
    presenting information associated with the unavailable in-line resource on a display.

13. The method of claim 1 further comprising:
    presenting information from the unavailability indicator on a display.

14. The method of claim 1 further comprising:
    storing information from the unavailability indicator into a database;
    filtering unavailability indicator information from the database in accordance with user-specified parameters; and
    presenting the filtered unavailability indicator information on a display.

15. A method for processing documents, the method comprising:
    retrieving a first structured document containing in-line resources;
    rendering a graphic object representing the first structured document;
    graphically marking on the graphic object that the first structured document has an unavailable in-line resource;
    associating the graphic object with additional objects having information associated with the unavailable in-line resource;
    displaying the graphic object and the associated additional objects within a single user interface window;
    prior to rendering the graphic object, examining a document object model maintained by a browser application for the first structured document; and
    determining that the document object model indicates that an in-line resource in the first structured document is unavailable, with the in-line resource and a corresponding in-line resource status being referenced within the document object model.

16. The method of claim 15 further comprising:
    generating a second structured document containing the graphic object and the associated additional objects, wherein the second structured document is displayed within the single user interface window.

* * * * *